United States Patent Office 3,257,619
Patented June 21, 1966

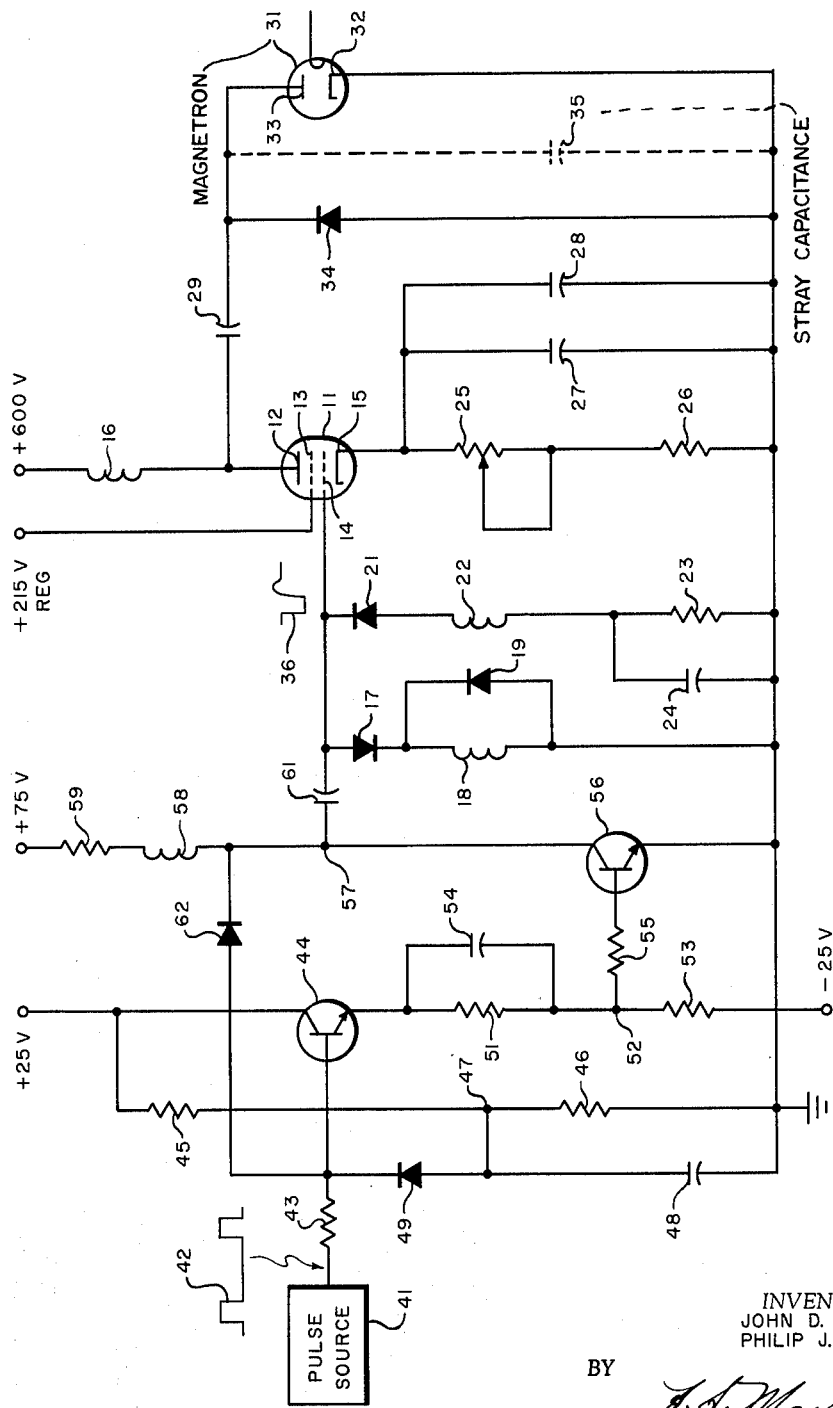

3,257,619
PULSE GENERATOR INCLUDING PARTICULAR-PULSE CONTROLLED VALVE MEANS TO DISCHARGE STRAY CAPACITANCE ASSOCIATED WITH LOAD
John D. Fackler, Bedford, and Philip J. Goetz, Yonkers, N.Y., assignors to General Precision, Inc., a corporation of Delaware
Filed Aug. 27, 1963, Ser. No. 304,935
10 Claims. (Cl. 328—65)

This invention relates generally to pulse generating circuits, and particularly to such circuits which are required to cause a rectangular current pulse having a fast fall time to pass through a load device having reactive components.

An example of a reactive load through which it is often desired to pass a rectangular current pulse is the microwave transmitting tube, such as a magnetron or klystron, used in pulsed radar equipment. In such equipment a substantially rectangular voltage pulse is applied to a pulse generating circuit which in turn applies a pulse to the transmitting tube causing it to generate pulses of microwave energy. The microwave energy is radiated into space, reflected by an object, and received by a receiver. The receiver is "gated off" during transmission and should be "gated on" as soon as possible after transmission has ceased in order to receive echoes from as large a portion of the transmitter pulse as possible. Ideally the starting and stopping of the generation of microwaves should be coincident with the leading and trailing edges of the rectangular timing voltage pulse applied to the pulse generating circuit in which case the receiver off time may be limited to the duration of the timing pulse.

The stopping of oscillation promptly at the end of the timing pulse is usually both more important and more difficult to achieve than the prompt starting of oscillation at the beginning of the timing pulse. Prompt stopping is more important because the lower limit of range, in the case of an object locating system, and of altitude, in the case of Doppler radar navigation equipment, is directly dependent upon the rapidity with which the receiver can be rendered operative after cessation of transmission. Prompt stopping is more difficult to achieve because the microwave generating tube has associated therewith inherent stray capacitance comprising interelectrode and wiring capacitance. Such stray capacitance becomes charged during the transmitting pulse and, after passage of the timing pulse, discharges through the microwave generating tube causing the voltage thereacross to fall gradually instead of dropping abruptly to zero. The transmitting tube generates useful oscillations at the desired frequency only when the applied voltage is at or near its maximum value but nevertheless generates extraneous oscillations at other frequencies until the voltage approaches zero. Such extraneous oscillations are useless for the purpose of the equipment and can be classified only as unwanted noise. Yet the receiver must be maintained in the "off" condition until the generation of noise has ceased.

The problem briefly outlined above is not new, but has become more critical with the development of Doppler radar navigation equipment which is required to operate at lower and lower altitudes. Prior solutions to the problem, such as the use of an auxiliary tube connected in parallel with the transmitter tube and rendered conductive at the end of the timing pulse, are inadequate for critical applications.

It is a general object of the present invention to provide an improved pulse generating circuit.

Another object is to provide a circuit for applying a voltage pulse having a fast time of fall to a reactive load.

Another object is to provide a circuit for causing a microwave generating tube to cease oscillating promptly at the end of a timing voltage pulse.

Briefly stated, one embodiment of the invention comprises a modulator tube with an inductor in the anode circuit. A transmitting tube constitutes the load and is coupled to the anode by a capacitor. The modulator tube is biased to be moderately conductive during the interval between pulses thereby charging the inductor. A driving or shaping circuit controlled by a series of rectangular timing pulses generates a series of pulses each having a steep negative going leading edge, a substantially flat bottom, and a steeply rising trailing edge which overshoots the initial potential, forming a positive peak transient of short duration. The latter pulses are applied to the grid of the modulator tube. Each pulse first cuts off the modulator tube whereupon the inductor discharges through the transmitter tube. The trailing edge of each pulse, with its positive overshoot, causes the modulator tube to conduct heavily thereby providing a very low impedance path to ground through which the stray capacitance discharges rapidly.

For a clearer understanding of the invention, reference may be made to the following detailed description and the accompanying drawing, the single figure of which is a schematic diagram of a preferred embodiment of the invention.

Referring now to the drawing, there is shown a tetrode modulator tube 11 including an anode 12, a screen grid 13, a control grid 14 and a cathode 15. The anode 12 is connected through an inductor 16 to a source of positive potential, for example, 600 volts. The screen 13 is connected to a well regulated source of lower positive potential such as 215 volts. The control grid 14 is biased to ground potential by two parallel networks. The first comprises a diode 17 the anode of which is connected to the grid 14 and the cathode of which is connected through an inductor 18 to ground. The inductor 18 is shunted by a diode 19 the anode of which is grounded. The second network comprises a diode 21 the cathode of which is connected to the grid 14 and the anode of which is connected to one terminal of an inductor 22 the other terminal of which is connected through a resistor 23 to ground. The resistor 23 is shunted by a capacitor 24. The function of these networks will be more fully discussed subsequently but for the present it is sufficient to note that they act to bias the grid 14 to ground potential.

The cathode 15 is connected through serially connected resistors 25 and 26 to ground, the resistor 25 being adjustable. Parallel connected capacitors 27 and 28 are connected between the cathode 15 and ground. The anode 12 is connected through a capacitor 29 to one terminal of a reactive load device 31, the other terminal of which is grounded. In the illustrative example being described, the load device 31 is a so-called "positive anode" magnetron, that is, a magnetron in which the cathode 32 is connected to the case and to ground and which therefore requires that a potential which is positive with respect to ground be applied to the anode 33. A restorer diode 34 has its cathode connected to the anode 33 and its anode grounded to keep the potential of the anode 33 from falling appreciably below ground potential. The inherent interelectrode and wiring capacitance of the magnetron 31 is shown by the capacitor 35 in dotted outline.

With no applied signal, the grid 14 is at ground potential. The voltage drop across the resistors 25 and 26 places a positive bias of about 8 or 10 volts on the cathode 15, and the tube 11 conducts moderately, the plate current being on the order of 150 milliamperes. The inductor 16 is charged. The capacitor 29 is charged to the potential of the anode 12 which is in the neighborhood of 240 volts. No current flows through the magnetron 31.

The magnetron 31 is rendered conductive periodically by the application of pulses, such as the pulse 36, to the grid 14. It will be understood that the pulse 36 is not drawn to scale but merely illustrates the shape. As the leading edge of the pulse 36 arrives, the potential of the grid 14 drops abruptly, cutting off the tube 11. The sudden change in current causes a voltage to be induced in the inductor 16. A large current pulse therefore flows through the capacitor 29 and the magnetron 31. Microwave oscillations are generated. Current flow continues while the pulse 36 holds the grid 14 negative. At the same time, the capacitors 27 and 28 discharge, the time constant of the resistors 25, 26 and the capacitors 27, 28 combination being selected so that the capacitors 27 and 28 are fully discharged before the arrival of the trailing edge of the pulse 36. Accordingly, the cathode 15 is brought to ground potential.

The trailing edge of the pulse 36 rises abruptly from its negative value to zero and overshoots, as shown, driving the grid 14 positive by about 10 volts. Since the cathode 15 is at ground potential, the tube 11 conducts heavily, drawing between one and two amperes. The tube 11 thus constitutes a very low impedance path to ground through which the stray capacitance 35 is quickly discharged. The potential of the anode 33 is returned to ground quickly, stopping the generation of energy by the magnetron 31. The potential of the anode 33 may even go slightly negative, but the diode 34 quickly restores the potential to ground. The positive peak transient of the pulse 36 persists for about 200 nanoseconds after which the potential of the grid 14 returns to ground. Cathode bias is restored, and the tube 11 returns to its moderately conductive state.

There remains to be discussed the apparatus for forming the pulse 36 with its all important overshoot. There is shown a source 41, such as a multivibrator, of a series of substantially rectangular positive going pulses 42. The output of the source 41 is connected through a resistor 43 to the base of a transistor 44. Serially connected resistors 45 and 46 are connected between a source of positive potential and ground and their values are selected to establish the potential of their junction 47 a few volts above ground. The resistor 46 is shunted by a capacitor 48. The base of the transistor 44 is connected to the cathode of a diode 49 the anode of which is connected to the junction 47. The collector of the transistor 44 is connected to a source of positive potential while the emitter of the transistor 44 is connected through a small temperature compensated resistor 51 to a junction 52. A larger resistor 53 is connected between the junction 52 and a source of negative potential. A capacitor 54 shunts the resistor 51. A resistor 55 has one terminal connected to the junction 52 and the other connected to the base of a transistor 56. The emitter of the transistor 56 is grounded while the collector is connected to a junction 57. The junction 57 is connected through an inductor 58 and a resistor 59 to a source of positive potential. The junction 57 is also connected to one plate of a capacitor 61 the other plate of which is connected to the grid 14. A diode 62 has its anode connected to the base of the transistor 44 and its cathode connected to the collector of the transistor 56.

The diode 49 biases the base of the transistor 44 to the potential of the junction 47, which is a few volts above ground. The transistor 44 is conductive and acts as an emitter follower. Emitter current through the resistors 51 and 53 establishes the potential of the junction 52 a few volts below ground so that the transistor 56 is nonconductive in the absence of a signal. The junction 57 is at the potential of the positive supply, which may be about +75 volts, and the capacitor 61 is charged to this potential.

Upon the arrival of the positive going leading edge of one of the pulses 42, the transistor 44, acting as an emitter follower, raises the potential of the junction 52, driving the transistor 56 suddenly into conduction. The sudden drop in potential of the junction 57 is passed through the capacitor 61 to the grid 14. Current flows through the inductor 58, charging it. If the transistor 56 were permitted to saturate, it would be more difficult, that is, it would take longer, to cut off. The diode 62 prevents the collector potential from falling too far and prevents saturation.

Upon the arrival of the trailing edge of the pulse 42, the potential of the junction 52 is restored to its former value of a few volts negative, and the transistor 56 is suddenly cut off. The inductor 58 starts to discharge, causing a positive current pulse to flow through the capacitor 61. This pulse cannot flow immediately through the inductor 18, because of its inductance, and accordingly flows to the grid 14, raising its potential above ground, as indicated by the overshoot on the waveform of the pulse 36. Grid current flows, and the tube 11 conducts heavily as previously discussed. As current builds up in the inductor 18, the voltage of the grid 14 is returned to zero. The diode 19 provides a path for the discharge of the inductor 18.

The inductor 22 is not absolutely essential and in some cases the inductor 22, the resistor 23 and the capacitor 24 may be replaced by a single resistor. However, the circuit illustrated has proved helpful and is preferred at present. The inductor 22, among other things, prevents excessive attenuation of the pulse 36 while permitting the establishment of the normal bias of zero volts on the grid 14.

A specific embodiment of the invention using the following components has been found satisfactory.

| | |
|---|---|
| Magnetron 31 | Microwave Associates, MA239. |
| Tube 11 | Type 4CX300A. |
| Transistor 44 | Type 2N1566. |
| Transistor 56 | Type 2N1893. |
| Inductor 16 | 300 millihenrys. |
| Inductor 18 | 330 microhenrys. |
| Inductor 22 | 680 microhenrys. |
| Inductor 58 | 330 microhenrys. |
| Capacitor 24 | 0.01 microfarads. |
| Capacitor 27 | 1500 micromicrofarads. |
| Capacitor 28 | 0.01 microfarads. |
| Capacitor 29 | 0.1 microfarads. |
| Capacitor 48 | 0.01 microfarads. |
| Capacitor 54 | 0.01 microfarads. |
| Capacitor 61 | 0.047 microfarads. |
| Resistor 23 | 10,000 ohms. |
| Resistor 25 | 50 ohms. |
| Resistor 26 | 10 ohms. |
| Resistor 43 | 1,000 ohms. |
| Resistor 45 | 5,100 ohms. |
| Resistor 46 | 510 ohms. |
| Resistor 51 | 470 ohms. |
| Resistor 53 | 5,100 ohms. |
| Resistor 55 | 120 ohms. |
| Resistor 59 | 1,600 ohms. |

Timing pulses:
Pulse repetition frequency _____ 60–120 k.c.p.s.
Pulse width (approx,) _____ 2–4 μsec.

The above described embodiment of the invention provided a pulse of about 300 milliamperes through the magnetron 31 lasting from about two to about four microseconds, depending upon the width of the timing pulses 42 from the source 41. The voltage at the anode 33 fell from 85% of maximum to 20% of maximum in about 70 nanoseconds, and fell from its full value of about 860 volts to zero volts in less than 200 nanoseconds.

The effectiveness of the invention is strikingly illustrated by tests. A complete Doppler radar navigation system using one of the prior art pulse generating circuits was constructed, installed on an aircraft, and tested. Operation was satisfactory except that the low altitude limit of operation was 120 feet above the terrain. Substitution of the pulse generating circuit of the present invention enabled the system to operate satisfactorily at altitudes down to 60 feet above the terrain. This improvement was achieved because the fast cut off of noise generation by the magnetron permitted the receiver to be "gated on" much sooner so as to receive useful signals at lower altitudes.

The illustrative embodiment of the invention above described employs a vacuum tube as a modulator valve and delivers positive output pulses. However, many of the principles of the invention are also applicable to pulse generators employing a solid state modulator valve and/or to generators delivering negative going output pulses.

Although a preferred embodiment has been described in considerable detail, many modifications will occur to those skilled in the art. It is therefore desired that the protection afforded by Letters Patent be limited only by the true scope of the appended claims.

What is claimed is:

1. A pulsing circuit, comprising:
an electronic valve,
an inductor,
a load device including reactive components,
means for biasing said valve to be normally moderately conductive,
means for charging said inductor through said valve while said valve is moderately conductive, and
means for discharging said inductor through said load periodically,
said last named means including means for periodically rendering said valve nonconductive for a first predetermined time interval and heavily conductive for a second predetermined time interval immediately following said first interval for rapidly discharging any stray capacitance associated with said reactive load device.

2. A pulsing circuit, comprising:
an electronic valve including a main discharge path and a control electrode,
an inductor,
a source of unidirectional voltage,
a first series circuit including said source, said inductor and said main discharge path,
a load device including reactive components,
a capacitor,
a second series circuit including said capacitor, said load device, and said main discharge path,
means for biasing said control electrode to a reference potential to render said valve moderately conductive, and
means for superimposing on said reference potential a repetitive series of voltage pulses each substantially rectangular in form except for the trailing edge thereof which overshoots said reference potential for a limited time in a direction opposite to that of the main body of each of said pulses for driving said valve to cut off from a moderately conducting condition and for driving said valve to a strongly conducting condition after cutoff.

3. A pulsing circuit, comprising:
an electronic valve including a main discharge path and a control electrode,
an inductor,
a source of unidirectional voltage,
a first series circuit including said source, said inductor and said main discharge path of said valve,
a load including reactive components,
a capacitor,
a second series circuit including said capacitor, said load, and said main discharge path of said valve,
means providing a normal potential to the control electrode for biasing said valve to be moderately conductive,
a source of substantially rectangular voltage timing pulses, and
a driving circuit interconnecting said source of pulses and said control electrode for superimposing control pulses on the normal potential of said control electrode for driving said valve to cut off from said moderately conductive condition,
said driving circuit including means for causing the trailing edge of each of said control pulses to overshoot the normal interpulse potential for driving said valve to conduct strongly after being driven to cut off.

4. A pulsing circuit comprising:
an electronic valve including a main discharge path and a control electrode,
an inductor,
a source of unidirectional voltage for normally holding said valve in a moderately conducting condition.
a first series circuit including said source, said inductor and said main discharge path of said valve,
a reactive load,
a capacitor,
a second series circuit including said capacitor, said load, and said main discharge path of said valve,
a source of substantially rectangular voltage timing pulses, and
a driving circuit interconnecting said source of pulses and said control electrode for driving said valve to cut off,
said driving circuit including means for forming a peak transient of reverse polarity on the trailing edge of each said rectangular pulses for driving said valve to conduct strongly after having been cut off.

5. A pulse generating circuit, comprising:
a source of unidirectional voltage,
an inductor,
an element the impedance of which can be controlled between upper and lower limits,
circuit means for connecting said source, said inductor and said element in series,
a capacitor,
a load having reactive components,
circuit means for connecting said capacitor and said load in series and for connecting the series combination in parallel with said element,
means for establishing the impedance of said element at a value intermediate said upper and lower limits, whereby current flows steadily through said inductor and said element but not through said load,
means for changing the impedance of said element abruptly from said intermediate value to said upper limit for a first predetermined time interval, whereby current flows through said load, and
means for changing the impedance of said element abruptly from said upper limit to said lower limit for a second predetermined time interval immediately following said first interval, whereby any change on said reactive components of said load is quickly discharged through said element.

6. A pulse generating circuit, comprising:
an electronic valve of controllable conductivity,
an inductor,
a load having reactive components,
means for controlling said valve to be normally moderately conductive,
means for charging said inductor while said valve is moderately conductive,
a capacitor,
a discharge path for said inductor including the series combination of said capacitor and said load, and
means for causing said inductor to discharge periodically through said discharge path,
said last named means including means for periodically controlling said valve to be nonconductive for a first predetermined time interval and heavily conductive for a second predetermined time interval immediately following said first interval for rapidly discharging any stray capacitance associated with said reactive load.

7. A pulse generating circuit, comprising:
an electron tube including a cathode, an anode and a control electrode,
means for normally biasing said control electrode to ground potential,
an inductor,
a source of positive voltage connected through said inductor to said anode,
resistive means for connecting said cathode to ground, whereby the conductivity of said tube is normally limited to a moderate value,
a capacitor,
a load having a first terminal grounded and a second terminal coupled by said capacitor to said anode,
clamp means for preventing the potential of said second terminal of said load from falling appreciably below ground potential, and
means for superimposing on the normal bias of said control electrode a repetitive series of voltage pulses, each of which has a steep negative going leading edge, a substantially flat bottom, and a trailing edge which overshoots ground potential constituting a positive peak transient of limited duration.

8. A pulse generating circuit, comprising,
an electronic tube including a cathode, an anode and a control electrode,
means for normally biasing said control electrode to ground potential,
an inductor,
a source of positive voltage connected through said inductor to said anode,
a resistive means and a first capacitive means connected in parallel for interconnecting said cathode and ground, whereby the conductivity of said tube is normally limited to a moderate value,
a second capacitive means,
a load having a first terminal grounded and a second terminal coupled by said second capacitive means to said anode,
a diode having its anode grounded and its cathode connected to said second terminal, and
means for superimposing on the normal bias of said control electrode a repetitive series of voltage pulses each having a steep negative going leading edge portion, an intermediate portion having a substantially constant negative potential for a first predetermined time interval, and a steep positive going trailing edge which overshoots ground potential for a second predetermined time interval which is short compared to said first interval,
said resistive means and said first capacitive means having a time constant which is short compared to said first predetermined time interval.

9. A circuit for generating a voltage pulse which is substantially rectangular except for the trailing edge thereof which momentarily overshoots the normal interpulse potential, comprising,
a source of unidirectional voltage having first and second terminals, said first terminal being connected to a common conductor,
a first inductor,
an element capable of being switched to be either conductive or nonconductive,
circuit means for serially connecting said second terminal, said inductor and said element to said common conductor,
a capacitor having one plate connected to the junction of said inductor and said element,
a load having a first terminal connected to the other plate of said capacitor and a second terminal connected to said common conductor,
a unidirectional conducting device and a second inductor serially connected between said first terminal of said load and said common conductor,
and means for maintaining said element normally nonconductive and for switching said element to be conductive periodically for a predetermined time interval,
whereby said first terminal of said load normally assumes a predetermined reference potential but departs abruptly therefrom at the beginning of said interval, during which interval said first inductor is charged, and
whereby immediately following the end of said interval said first inductor discharges, first through said load causing said first terminal of said load to depart from said reference potential in the opposite direction, and then through said second inductor, returning said first terminal of said load to said reference potential.

10. Apparatus for generating a series of voltage pulses each having a steep negative going leading edge, a portion having a substantially constant negative voltage, and a trailing edge including a positive peak transient, comprising,
a source of voltage positive with respect to ground,
a first inductor,
an element capable of being switched rapidly between states of conduction and nonconduction,
said inductor and said element being serially connected in that order between said source and ground,
a capacitor,
a load having a first terminal grounded and a second terminal coupled by said capacitor to the junction of said first inductor and said element,
a diode and a second inductor serially connected with the anode of said diode connected to said second terminal and said second inductor connected between the cathode of said diode and ground, and
means for controlling said element to be normally nonconductive and periodically conductive for a predetermined time interval.

References Cited by the Examiner
UNITED STATES PATENTS

| 2,442,304 | 5/1948 | Mayle | 328—66 |
| 2,598,134 | 5/1952 | Schade | 328—258 |
| 2,726,329 | 12/1955 | Henderson | 322—223 |
| 2,980,859 | 4/1961 | Oliver | 328—230 |
| 3,078,418 | 2/1963 | Theodore | 328—66 |

ARTHUR GAUSS, *Primary Examiner.*

J. S. HEYMAN, J. ZAZWORSKY, *Assistant Examiners.*